Figure 1:
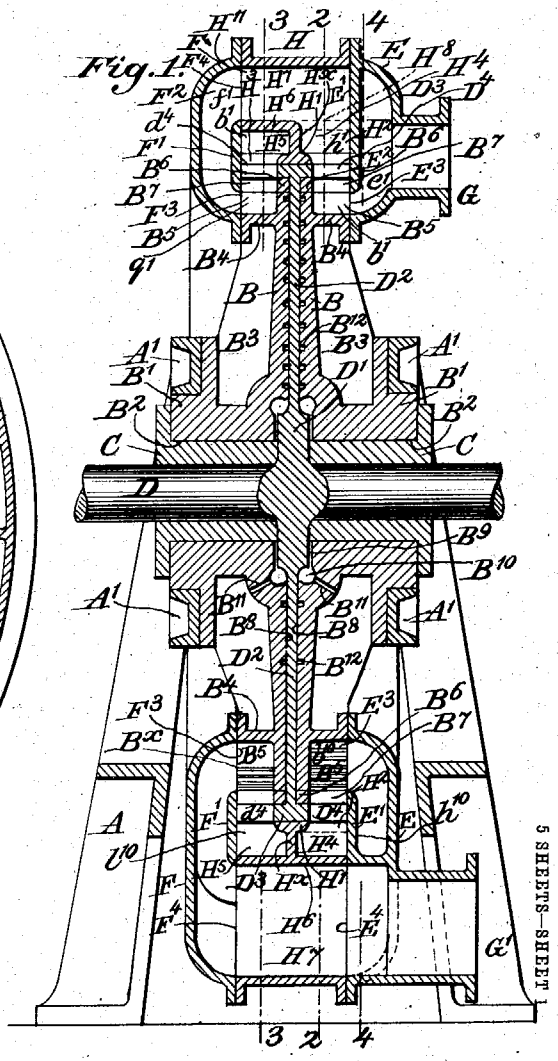

No. 12,469. REISSUED APR. 3, 1906.

B. S. CHURCH.

EXPANSIBLE FLUID TURBINE.

APPLICATION FILED MAR. 5, 1906.

5 SHEETS—SHEET 1.

Witnesses:

Sidney F. Smith

Robert H Kammler.

Inventor:

Benjamin S. Church by

Emery T. Booth

Attorney

No. 12,469. REISSUED APR. 3, 1906.

B. S. CHURCH.

EXPANSIBLE FLUID TURBINE.

APPLICATION FILED MAR. 5, 1906.

5 SHEETS—SHEET 2.

Witnesses:
Sidney F. Smith
Robert H. Kammler.

Inventor,
Benjamin S. Church
by Emery Booth
Attorneys

No. 12,469. REISSUED APR. 3, 1906.

B. S. CHURCH.

EXPANSIBLE FLUID TURBINE.

APPLICATION FILED MAR. 5, 1906.

5 SHEETS—SHEET 3.

Witnesses:
Sidney F. Smith
Robert H. Kammler

Inventor,
Benjamin S. Church
by Emery Booth
attorneys

No. 12,469. REISSUED APR. 3, 1906.

B. S. CHURCH.

EXPANSIBLE FLUID TURBINE.

APPLICATION FILED MAR. 5, 1906.

5 SHEETS—SHEET 4.

Witnesses:

Sidney F. Smith

Robert H. Kammler.

Inventor:

Benjamin S. Church by Emery B. Booth

Attorneys

No. 12,469. REISSUED APR. 3, 1906.
B. S. CHURCH.
EXPANSIBLE FLUID TURBINE.
APPLICATION FILED MAR. 5, 1906.
5 SHEETS—SHEET 5.
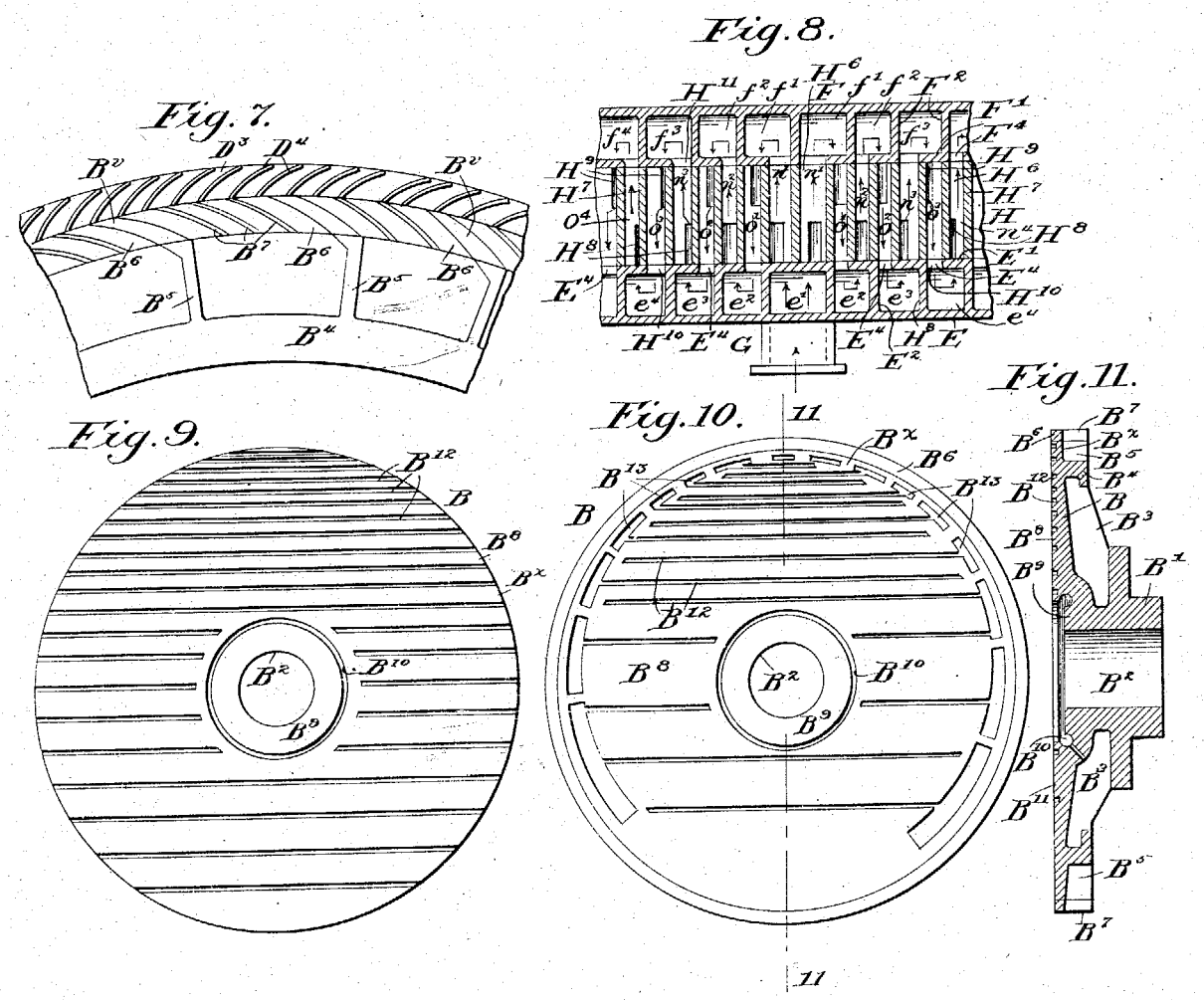
Witnesses:
Sidney F. Smith.
Robert H. Kammler.
Inventor:
Benjamin S. Church
by Emery Booth
Attorneys

UNITED STATES PATENT OFFICE.

BENJAMIN S. CHURCH, OF NEW YORK, N. Y., ASSIGNOR TO JAMES K. LANNING, TRUSTEE, OF BOSTON, MASSACHUSETTS.

EXPANSIBLE-FLUID TURBINE.

No. 12,469. Specification of Reissued Letters Patent. Reissued April 3, 1906.

Original No. 753,855, dated March 8, 1904. Application for reissue filed March 5, 1906. Serial No. 304,415.

*To all whom it may concern:*

Be it known that I, BENJAMIN S. CHURCH, a citizen of the United States of America, residing in the city, county, and State of New York, have invented a certain new and useful Improvement in Expansible-Fluid Turbines, of which the following is a true and exact description, reference being had to the accompanying drawings, which form a part thereof.

My invention relates to the construction of turbine-engines for use with expansible fluids, such as steam.

It has for its object to provide an engine of this character which will utilize the power of the steam admitted to it to a very high degree, which is especially adapted to avoid the loss of power through leakage, in which provision is made for so distributing the impulses which actuate the turbine as to balance them as nearly as possible, and in which provision is made for operating the engine at a comparatively low rate of speed without sacrificing the available energy in the steam and without unduly increasing the size of the engine as a whole.

My engine embodies a construction in which a bucket-wheel is employed having a circumferential series of buckets in connection with a casing having a series of chambers and directing-ports, each chamber communicating with the one in advance of it through a port and the buckets successively and with the one at its rear through the buckets and the port leading from said rear chamber in succession, and a very important feature of my invention consists in making the ports of progressively greater area corresponding to the increasing volume of the steam and each of such area as will give passage to the same weight of steam in the same time and in making the chambers also of progressively greater area and each of considerably greater area than the volume of the steam actually passing through the turbine at the pressures existing in the chambers. In this way I to a large extent eliminate the element of accelerated velocity due to the progressive expansion of the steam, reconverting much of the velocity generated in each passage of the steam through the buckets into pressure in the receiving-chamber, and thus facilitate the mode of operation which I prefer and in which the steam at each passage of the buckets moves with the same velocity.

One of the leading features of my invention consists in dividing the steam admitted at one side of the turbine-wheel into two volumes and passing each volume in opposite directions around the circumference of the wheel to a discharge port or ports lying at the opposite side of the axis of the wheel to the admission-port, each of the divided volumes of steam being caused to act repeatedly upon the blades of the turbine-wheel, the chambers through which it passes being preferably of increasing area and the ports of such increasing size that each will pass the same weight of the expanding steam and with the same degree of velocity, so that the various impulses given to the turbine-wheel will be equal. It will readily be seen that by this arrangement the pressure on both sides of the wheel is practically the same and also that it avoids bringing together into close juxtaposition volumes of steam at materially different pressure, a condition, of course, which is most likely to promote injurious leakage and loss of power.

Another important feature of my invention consists in providing the turbine-wheel with two peripheral lines of buckets and causing the steam on its way from the admission to the exhaust port to pass alternately through buckets of the two systems. This construction enables me to double the number of drops in steam-pressure between the admission and discharge ports, with a corresponding diminution in the speed at which the turbine should normally run for highest efficiency, and arranging the buckets on opposite sides of the supporting-disk, as I do by preference, it also enables me to balance the pressure on the wheel with great nicety.

Other features of my invention will be best understood as described in connection with the drawings, in which they are illustrated, and in which—

Figure 2:
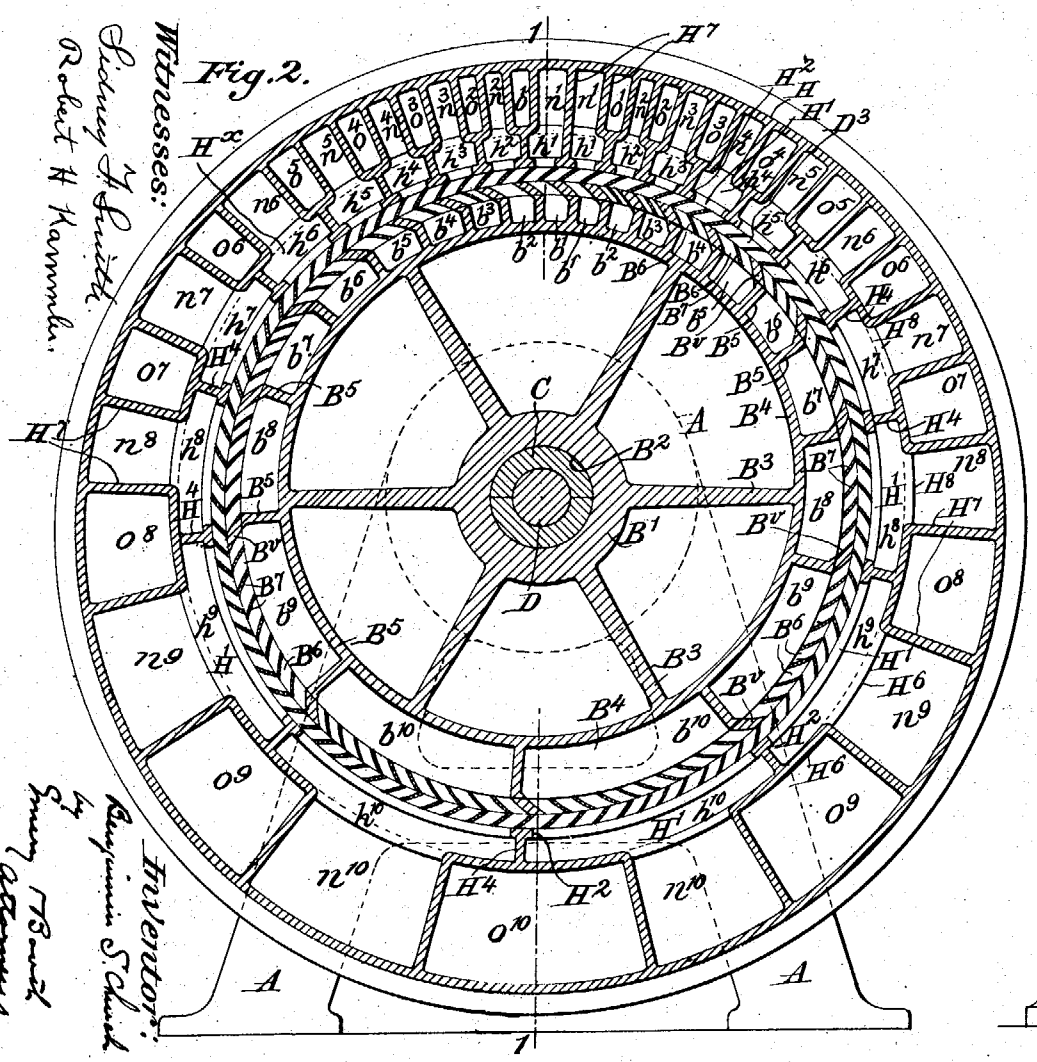
Figure 3:
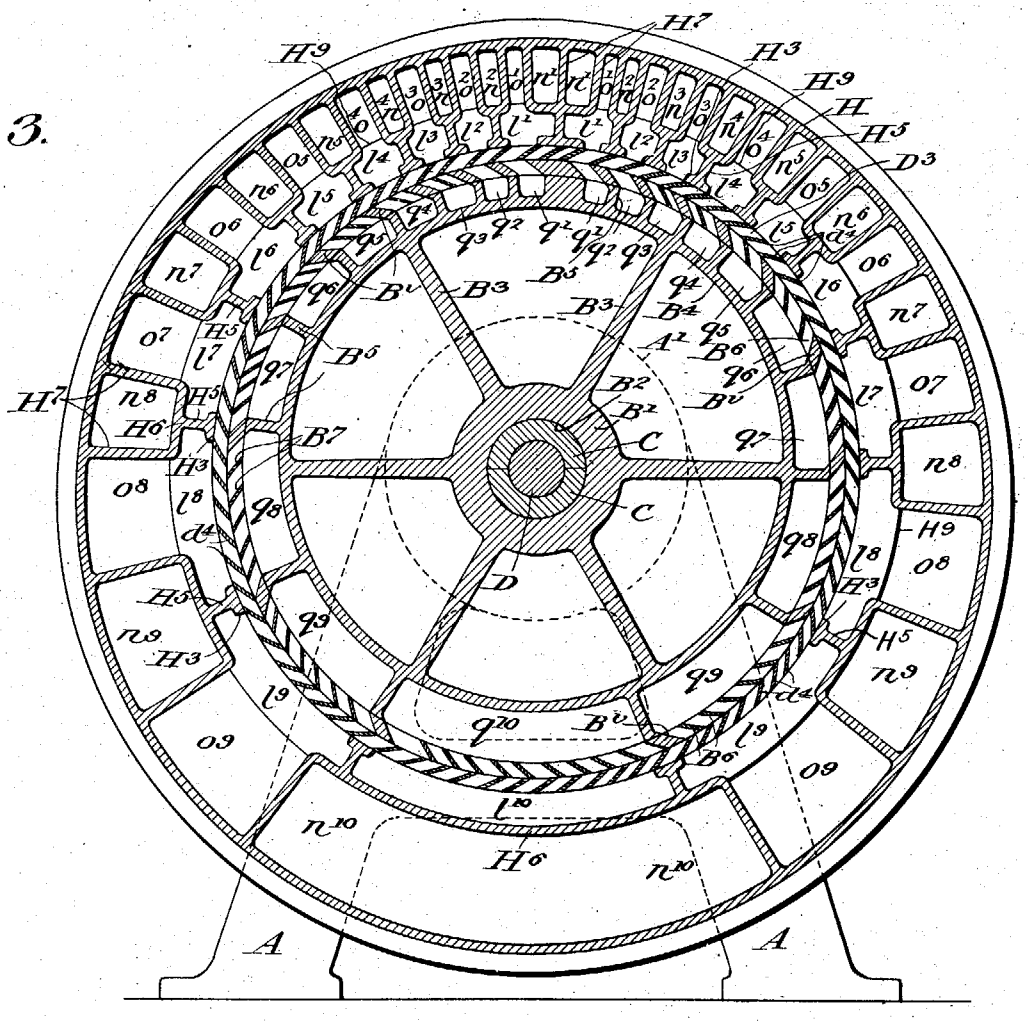
Figure 4:
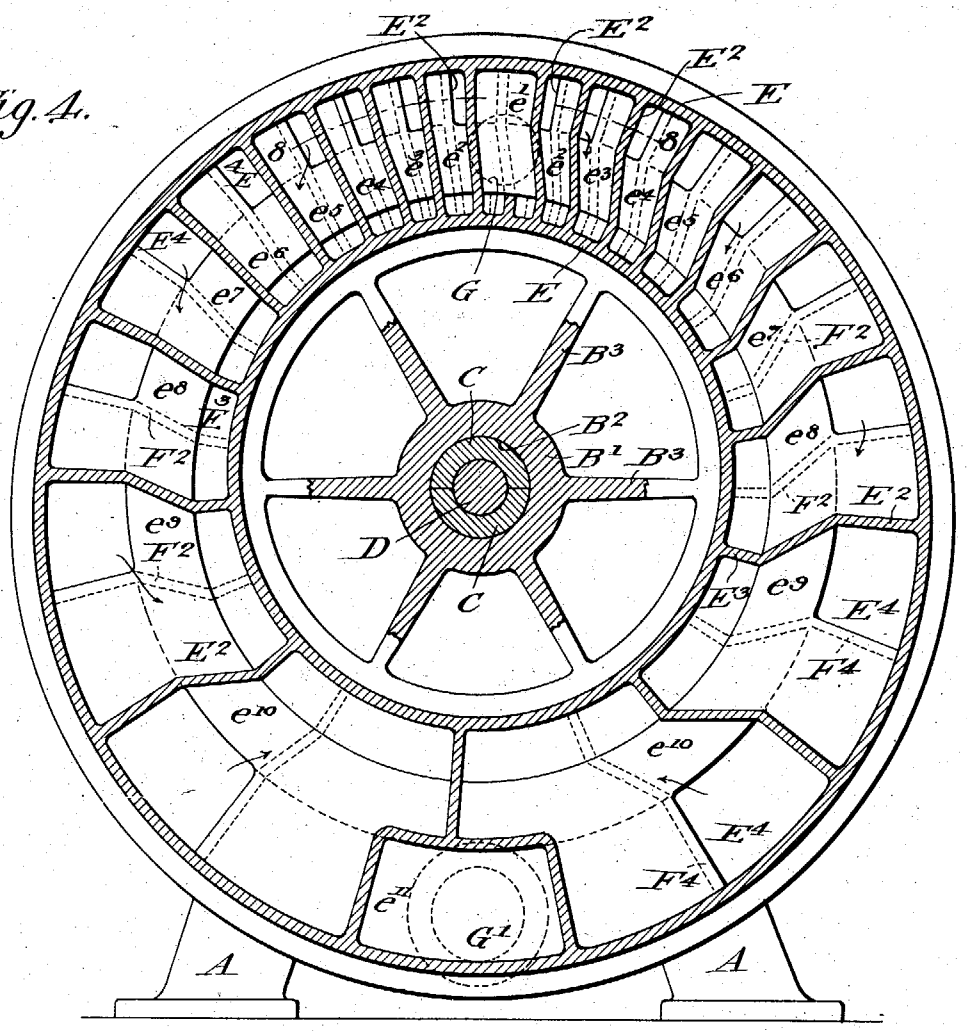
Figure 5:
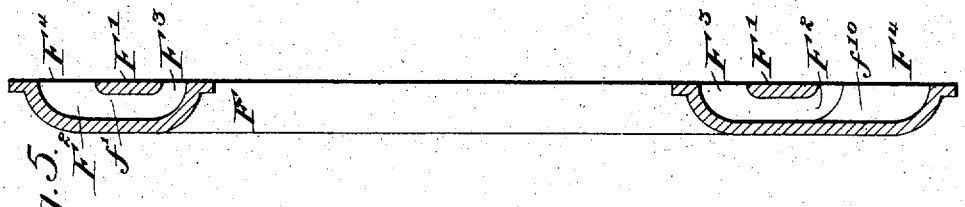
Figure 6:
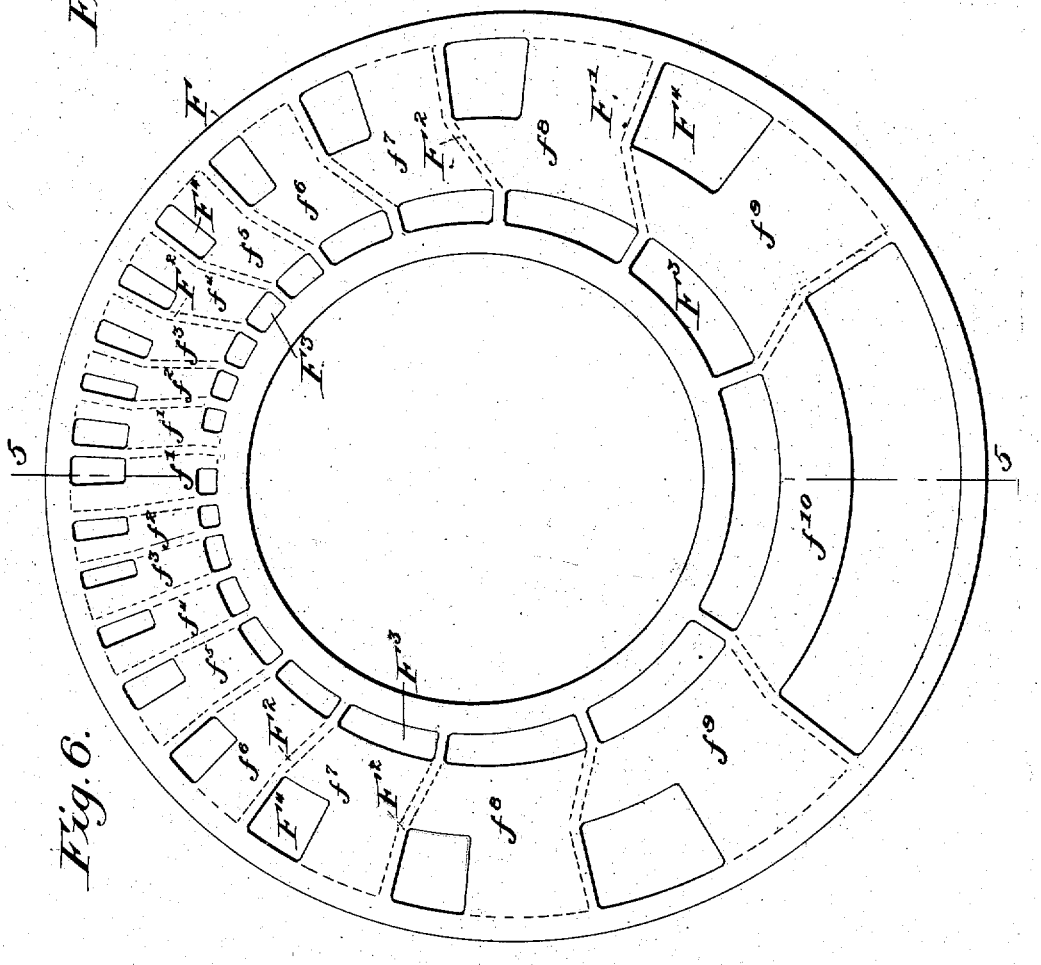

Figure 1 is a vertical cross-section through an engine having my improvements, taken on the line 1 1 of Fig. 2. Fig. 2 is a longitudinal section taken on the line 2 2 of Fig. 1; Fig. 3, a similar section taken on the line 3 3 of Fig. 1; Fig. 4, a similar section taken on the line 4 4 of Fig. 1. Fig. 5 is a cross-section through one side of the side castings of the engine, taken on the line 5 5 of Fig. 6. Fig. 6 is a face view of this side casting. Fig. 7 is a detail view, on a larger scale, showing the buckets of the turbine, the directing-ports through which the steam is led to the turbine, and the chambers connecting with the admission and directing ports. Fig. 8 is a diagrammatic view indicat[illegible] being taken on the curved section-line 8 8 of Fig. 4. Fig. 9 is a face view of one of the castings between which the disk of the turbine-wheel turns. Fig. 10 is a similar view of a modified and preferred form, and Fig. 11 is a cross-sectional view taken on the line 11 11 of Fig. 10.

A indicates the frame or standards upon which the turbine-engine is supported. Upon the top of the standards, as shown, are annular bearings A′, in and upon which are supported the side-plate castings B B, these side-plate castings being made with hub-like extensions B′, which fit into the annular flanges A′, as shown best in Fig. 1, and in which are formed circular bearings, as indicated at $B^2$, for the shaft D of the engine.

$B^3$ indicates bracing-ribs for the side castings B, and $B^4$ outwardly-extending flanged annular ribs between which and a peripheral extension $B^\times$ of the plates B extend a series of partitions $B^5$, dividing the spaces between the flanges $B^4$ and $B^\times$ into a series or, preferably, as shown, into two series of chambers, as indicated at $b'$ $b^2$ $b^3$, &c.

$B^6$ is an annular ring which may be formed integral with the plate B or separate and fitted to it, as indicated in Figs. 10 and 11, and which serves to support the walls $B^v$ of the directing-ports, through which the steam is admitted to the turbine, and also the directing-veins $B^7$, which lie between said walls $B^v$, as best shown, for instance, in Fig. 7.

The two plates B B fit nicely but clearing the disk $D^2$, which supports the blades of the turbine, a very small clearance in a well-balanced engine being sufficient to prevent injurious friction, and in order to avoid or at least greatly diminish the loss of efficiency through leakage between the disk and the plates B B, I form in the faces of said plates a series of fluid-packing grooves, which irrespective of any particular arrangement will serve their well-known function of preventing or greatly diminishing leakage. By preference, however, I form these grooves in the faces of the plates B, which faces are indicated at $B^8$, as is shown at $B^{12}$—that is to say, running across the faces of the plates at lines substantially transverse to a line connecting the admission and exhaust ports of the engine—the said grooves either extending through the edges of the plate, as indicated in Fig. 9, or, by preference, communicating with apertures $B^{13}$, formed through the wall $B^\times$ of the plate and opening into the chambers into which the annular space between the flanges $B^4$ and $B^\times$ is divided, as above described. Near the center of the plates B their faces are recessed, as indicated at $B^9$, so as to make room for the enlarged hub portion D′ of the plate $D^2$, a considerable clearance being preferably provided, as indicated in Fig. 1, and annular oil-receiving grooves $B^{10}$ being formed in the plates communicating with the outer faces of the plates by ducts at the bottom, as indicated at $B^{11}$. Some receptacle or conduit should of course be supplied to carry off the oil from the ducts $B^{11}$, though as this may be of any desired construction I have not illustrated such a receptacle in the drawings.

C C are bearings fitted in the bearings $B^2$ of the side plates and serving to support the shaft D, which, with its hub portion $D^8$ and disk $D^2$, have been already mentioned. By preference the shaft and disk are made integral, as is also the annular rim $D^3$ at the end of the disk $D^2$, which fits nicely over the edge of the annular ring $B^6$ and is provided, as shown, with two series of buckets, (indicated at $D^4$ and $d^4$,) said buckets extending in opposite directions from the edges of the rim $D^3$, the buckets lying immediately over the walls and veins $B^\times$ and $B^7$, as is indicated in the drawings.

The "casing," so to speak, of the engine is made up of two plates B B and the three additional parts, each of which may conveniently be a single casting, (indicated at E, F, and H,) the casting E being provided with an admission-port G at its top and an exhaust-port G′ at its bottom. The casting E is annular, forming between its curved outer wall and flat inner wall E′ an annular chamber, which is divided by partitions (indicated at $E^2$ and best shown in Fig. 4) into two series of chambers, (indicated at $e'$ $e^2$ $e^3$, &c.,) the chamber $e'$ being common to both series, and one series extending on each side of the annular casting until it connects, through the common bottom chamber $e^{11}$, with the exhasut-port G′, and it will be observed that the chambers are progressively of greater capacity. Each of the chambers formed in the annular casting E is provided with two openings through flat face E′ of the casting, one series (indicated at $E^4$) extending through the outer edge of the flat face and communicating with the chambers $o'$ $o^2$ $o^3$, &c., formed in the casting H, to be hereinafter described, while the other series of openings (indicated at $E^3$ $E^3$ &c.) communicate through the inner edge of the flat face E′ with the series of chambers $b'$ $b^2$, &c., formed in the right-hand plate B, as indicated in Fig. 1, the similar chambers formed in the left-hand plate B in said figure being indicated at $q'$ $q^2$ $q^3$, &c. The casting F is of a generally similar character to the casting E, except in the arrangement of its partition-walls, (indicated at $F^2$,) the differences being exactly shown in Fig. 4, where the partition-walls $E^2$ of the casting E are shown in section and the partition-walls $F^2$ of the casting F in dotted lines. Each of the chambers $q'$ $q^2$, &c., of the casting F is provided with two openings through the flat face-plate F′, those formed through the outer face of the face-plate being indicated at $F^4$ and communicating with the chambers $n'$ $n^2$ $n^3$, &c., formed in the casting H, while the openings (indicated at $F^3$) formed through the inner edge of the face-plate communicate with the series of chambers $q^8$ $q^2$, &c., formed on the edge of the left-hand face-plate B. The central casting H, lying between the castings E and F, has an annular outer wall and also a narrower inner wall, (indicated at H′,) which fit nicely about the outer face of the wheel-rim $D^3$ and from which extend lateral division-plates, those lying to the right, as shown in Fig. 1, being indicated at $H^2$ and shown in Fig. 2, and those lying to the left being indicated at $H^3$ and shown in Fig. 3. The division-plates $H^2$ register with the partitions $B^5$ of the right-hand casting B, and those lying to the left register with the partitions $B^5$ of the left-hand casting B, as is clearly shown in Figs. 2 and 3. An annular central flange $H^\times$ extends upward from the inner ring H′ to an intermediate annular ring $H^6$, while partition-walls $H^4$ and $H^5$, rising, respectively, from the bars $H^2$ and $H^3$, separate the inner zone of the casting H into two series of chambers, those lying at the right-hand of the center, as indicated in Fig. 1, being indicated at $h'$ $h^2$ $h^3$, &c., (see Fig. 2,) and those to the left hand of the center of the engine, as shown in Fig. 1, being indicated at $l'$ $l^2$ $l^3$, &c., as indicated in Fig. 3. The space lying between the intermediate annular wall $H^6$ and the outer wall of the casting H is divided by transverse partitions $H^7$ into chambers, one (or rather a double) series of which is indicated at $n'$ $n^2$ $n^3$, &c., while the other double series is indicated at $o'$ $o^2$ $o^3$, &c., the chambers $o'$ $o^2$, &c., communicating with the chambers $e^2$ $e^3$, &c., of the casting E, as already described and as shown in Fig. 8, while the chambers $n'$ $n^2$, &c., communicate with the chambers $f'$ $f^2$, &c., of the casting F. A series of openings $H^8$ in the intermediate partition $H^6$ connect the chambers $n'$ $n^2$, &c., with the chambers $h'$ $h^2$, &c., and a series of similar openings (indicated at $H^9$) connect the chambers $o'$ $o^2$, &c., with the chambers $l'$ $l^2$, &c.

In operation steam is admitted to the engine through the port G, entering the central chamber, (indicated at $e'$ and best shown in Fig. 4,) from which it passes downward into the two chambers $b'$ $b'$ of the right-hand casting B (see Fig. 2) from the directing-ports formed in the ring $D^6$, and communicating with these chambers the steam passes to and impinges upon the buckets of the turbine and then passes into the two chambers $h'$ $h'$ in the annular casting H. Thence it passes upward into the two chambers $n'$ $n'$, (see Figs. 2 and 3,) and thence into the two chambers $f'$ $f'$ of the left-hand casting F. (See Figs. 1, 6, and 8.) From these two chambers the steam passes to the chambers $q'$ $q'$ in the left-hand casting B and thence through the proper directing-ports it is impinged upon the buckets of the wheel and after passing through the wheel enters the chambers $l'$ $l'$ in the casting H, from which it passes to the chambers $o'$ $o'$, and from these chambers to the chambers $e^2$ $e^2$ in the casting E, from which it enters the chambers $b^2$ $b^2$ in the right-hand casting B, passing thence through the directing-ports, again through the buckets of the wheel. This circulation of the steam through the various chambers and ports of the engine continues, one volume passing around the periphery of the wheel to the right and the other around the periphery of the wheel to the left until they are merged in the chamber $f^{11}$, from which they pass through the chamber $n^{10}$ and the chamber $e^{11}$ to the exhaust-port G′. The area of the chambers is progressively larger, as shown, to accommodate the increasing volume of the steam as it expands and, by preference, to overcome the momentum of the steam, so that each chamber will serve practically as a reservoir from which the steam will issue through the directing-port against the buckets of the wheel with only such velocity as it should have, owing to the difference in pressure between adjacent connected chambers, this engine working most satisfactorily when the parts are proportioned so as to effect a uniform drop in temperature between each pair of connected chambers, the ports in all cases being proportioned, as already stated, to pass in a given time a uniform weight of steam and with identical velocities, so that each impulse communicated to the buckets of the turbine is uniform in force and velocity with the others.

It will readily be understood that by dividing the volume of steam as described and passing the divided volumes in opposite directions around the periphery of the wheel I avoid leakage, such as is due in engines of this character, to the juxtaposition of relatively very high and very low pressure chambers, and it will also be clear that my construction and arrangement of parts is one which effects a true and perfect balance, a matter of considerable importance in engines of this character, which will necessarily rotate at a high rate of speed, though my construction, as will be obvious to those skilled in the art, enables me to run at a much lower rate of speed than has been usually practicable with turbine-engines or at least practiced with a proper economical use of steam.

Having now described my invention, what I claim as new, and desire to secure by Letters Patent, is—

1. A turbine for expansible fluids having a wheel provided with a circumferentially-arranged series of buckets, in combination with a casing having a multiple series of chambers and directing-ports, each port leading through the bucket to a succeeding chamber, the ports being progressively of increasing area corresponding to the increasing expansion of the fluid and each adapted to give passage to the same weight of fluid in the same time, and the chambers being progressively of increasing area and of materially greater area than the volume of the steam actually passing through the turbine at the pressures existing in the chambers whereby the velocity of the entering steam is checked and the velocity of the steam passing out through the ports regulated by the pressure in the chambers.

2. A turbine for expansible fluids having an admission-port and an exhaust-port on opposite sides of the center, a circumferentially-arranged series of buckets on the wheel proper and two series of chambers and directing-ports leading from the admission to the exhaust port, one series arranged on each side of the wheel and said chambers and ports communicating with each other through the buckets of the wheel.

3. A turbine for expansible fluids having an admission-port and an exhaust-port on opposite sides of its center, a circumferentially-arranged series of buckets on the wheel proper, two series of chambers, one arranged on each side of the wheel between the admission and exhaust ports, said chambers being progressively larger and each of area sufficient to check the velocity of the steam passing through it, a series of ports, one leading into each chamber from the buckets of the wheel and a series of directing-ports, one leading from each chamber to the buckets of the wheel said directing-ports being progressively larger and each adapted to pass a uniform weight of the progressively-expanding fluid at uniform velocities.

4. A turbine for expansible fluids having a disk-like wheel secured to its main shaft and provided with buckets around its circumference in combination with a wheel-casing having parallel plates forming a nice fit with the sides of the disk-like center of the turbine, said casing-plates having a series of fluid-packing grooves on their faces lying opposite to the disk, admission and exit ports situated on opposite sides of the wheel-center and two series of chambers and directing-ports, one series extending on each side of the wheel from the admission to the exhaust ports, the chambers of each series communicating with each other in series through the directing-ports and the buckets of the wheel.

5. A turbine for expansible fluids having a disk-like wheel secured to its main shaft and provided with buckets around its circumference in combination with a wheel-casing having parallel plates forming a nice fit with the sides of the disk-like center of the turbine, said casing-plates having a series of fluid-packing grooves on their faces lying opposite to the disk, said grooves extending across the face of the casing and substantially at right angles to the line connecting the inlet and exhaust ports, admission and exit ports situated on opposite sides of the wheel-center and two series of chambers and directing-ports, one series extending on each side of the wheel from the admission to the exhaust ports, the chambers of each series communicating with each other in series through the directing-ports and the buckets of the wheel.

6. A turbine for expansible fluids having a disk-like wheel secured to its main shaft and provided with buckets, around its circumference in combination with a wheel-casing having parallel plates forming a nice fit with the sides of the disk-like center of the turbine, said casing-plates having a series of fluid-packing grooves on their faces lying opposite to the disk, said grooves extending across the face of the casing and substantially at right angles to the line connecting the inlet and exhaust ports and said casing having openings through its edges leading into chambers on the sides of the turbine and into which openings the fluid-packing grooves open, admission and exit ports situated on opposite sides of the wheel-center and two series of chambers and directing-ports one series extending on each side of the wheel from the admission to the exhaust ports, the chambers of each series communicating with each other in series through the directing-ports and the buckets of the wheel.

7. A turbine for expansible fluids having in combination a wheel provided with two circumferentially-arranged sets of buckets arranged side by side, a casing having inlet and exhaust ports set opposite to each other, partitions arranged in the casing to divide it into two sets of chambers of increasing size, one set extending from the inlet to the exhaust port on each side of the wheel, and directing-ports leading from each chamber to the successive one through the buckets of the wheel and alternately through buckets of the separate sets of buckets.

8. A turbine for expansible fluids having in combination a wheel provided with two circumferentially-arranged sets of radial buckets arranged side by side, a casing having inlet and exhaust ports set opposite to each other, partitions arranged in the casing to divide it into two sets of chambers of increasing size, one set extending from the inlet to the exhaust port on each side of the wheel and radially-arranged directing-ports leading from each chamber to the successive one through the buckets of the wheel and alternately through buckets of the separate sets of buckets.

9. A turbine for expansible fluids having in combination a wheel provided with two circumferentially-arranged sets of buckets set side by side, a casing having inlet and exhaust ports, a series of fluid-chambers formed in the casing between the inlet and exhaust ports connected in series through the buckets of the wheel and arranged to successively deliver the fluid alternately to buckets of the two series.

10. A turbine for expansible fluids having in combination a wheel provided with two circumferentially-arranged sets of radial buckets set side by side, a casing having inlet and exhaust ports, a series of fluid-chambers formed in the casing between the inlet and exhaust ports connected through buckets of the alternate series, and directing-ports one leading from each chamber to the buckets and all arranged to deliver the fluid to the inner edges of the radially-arranged buckets.

11. A turbine for expansible fluids having in combination a wheel provided with two circumferentially-arranged sets of buckets, a casing having inlet and exhaust ports arranged on opposite sides of the wheel-center, two series of fluid-chambers formed in the casing connecting the inlet and exhaust ports on opposite sides of the wheel, said series of chambers being connected in series through the buckets of the wheel, and arranged to successively deliver the fluid alternately to buckets of the two series.

12. In an apparatus designed for the passage therethrough of a fluid of progressively-changing density, the combination with a wheel, of a series of buckets arranged thereon concentrically with reference thereto, and a fluid-conducting casing operatively related to the buckets, said casing being adapted to pass the fluid through said bucket series a plurality of times and having a series of chambers provided each with a receiving-port and a separate discharging-port, said chambers and their respective ports being arranged with progressively-varying capacity and size in accordance with the progressively-varying volume of said fluid.

13. In an apparatus designed for the passage therethrough of a fluid of progressively-changing density, the combination with a wheel, of a series of buckets arranged thereon concentrically with reference thereto and a fluid-conducting casing operatively related to the buckets, said casing being adapted to pass the fluid through said bucket series a plurality of times and having a series of chambers provided each with a receiving-port and a separate discharging-port, said chambers and their respective ports being arranged with progressively-varying capacity and size in accordance with the progressively-varying volume of said fluid and said chambers intermediate the respective ports thereof being of relatively greater cross-section than said ports, and constituting thereby successive fluid-reservoirs.

14. In an apparatus designed for the passage therethrough of a fluid of progressively-changing density, the combination with a wheel, shaft and bearings therefor, of a series of buckets carried by said wheel and concentric with reference thereto and a plurality of fluid-conducting casings in operative relation to said buckets and having each a primary inlet-port and a terminal outlet-port with intervening fluid-chambers, the high-pressure ports and chambers of one series being adjacent circumferentially in the concentric arrangement to the high-pressure ports and chambers of another series.

15. A turbine for expansible fluids having a wheel provided with a circumferentially-arranged series of buckets, a fluid-conducting casing operatively related to the buckets and adapted to pass the fluid from a primary inlet-port to a terminal outlet-port, said casing having a series of chambers provided each with a receiving-port and a separate discharging-port, said chambers being arranged with progressively-increasing capacity and size in accordance with the progressively-increasing volume of said fluid and said chambers being so arranged successively that each successive receiving-port is operatively related to the preceding discharge-port through the bucket-path.

16. A turbine for expansible fluids having a wheel provided with a circumferentially-arranged series of buckets, a fluid-conducting casing operatively related to the buckets and adapted to pass the fluid from a primary inlet to a terminal outlet through said bucket series a plurality of times, said casing having a series of chambers provided each with a receiving-port and a separate discharging-port, said chambers being arranged with progressively-increasing capacity and size in accordance with the progressively-increasing volume of said fluid and so arranged successively that each successive receiving-port is operatively related to the preceding discharge-port through the bucket-path, said chambers intermediate the respective ports thereof being of greater cross-section than said ports.

17. A turbine for expansible fluids provided with a wheel, shaft and bearings therefor, and having buckets arranged upon said wheel concentric therewith, and a plurality of fluid-conducting casings operatively related to said buckets and having each a primary inlet-port and terminal outlet-port with intervening fluid-chambers, the high-pressure ports and chambers of one series being adjacent circumferentially in the concentric arrangement to the high-pressure ports and chambers of another.

In testimony whereof I have signed my name to this specification in the presence of two subscribing witnesses.

BENJAMIN S. CHURCH.

Witnesses:
CHARLES D. LANNING,
HENRY POLLACK.